United States Patent
Kralicek et al.

[15] 3,674,751
[45] July 4, 1972

[54] METHOD OF MANUFACTURING POLYAMIDES BY ALKALINE POLYMERIZATION OF CYCLIC LACTAMS

[72] Inventors: Jaroslav Kralicek, Praha; Vladimir Kubanek, Kralupy; Jitka Solcova; Jaroslava Kondelikova, both of Praha, all of Czechoslovakia

[73] Assignee: Zavody Antoniza Zapotockeho, narodni podnik, Jaromer, Czechoslovakia

[22] Filed: Dec. 22, 1969

[21] Appl. No.: 887,399

[52] U.S. Cl.................................260/78 L, 260/239.3
[51] Int. Cl..................................................C08g 20/18
[58] Field of Search...................................260/78 L

[56] References Cited

UNITED STATES PATENTS

| | | | |
|---|---|---|---|
| 2,882,244 | 4/1959 | Milton | 252/455 |
| 3,090,773 | 5/1963 | Papero et al. | 260/78 L |

*Primary Examiner*—William H. Short
*Assistant Examiner*—L. M. Paynes
*Attorney*—Arthur O. Klein

[57] ABSTRACT

An improved process for manufacturing polyamides by alkaline polymerization of cyclic lactams which consists of reacting alkali metal hydroxides or alcoholates with the lactams, with water or the corresponding alcohol being removed and putting the reaction mixture into contact with molecular sieves.

7 Claims, No Drawings

METHOD OF MANUFACTURING POLYAMIDES BY ALKALINE POLYMERIZATION OF CYCLIC LACTAMS

The invention relates to a method for manufacturing polyamides by alkaline polymerization of cyclic lactams, using a strong base as catalyst and a compound with an activated carbonyl group in a lactam molecule having the formula:

where X is a polar substituent, or substances capable of forming said activated carbonyl group as activator, said catalyst being prepared in situ by reacting an alkali metal hydroxide or alcoholate of lower molecular weight than the lactam used, the invention consisting in removing the low molecular weight by-product of the reaction, i.e., either water or a lower alcohol by means of molecular sieves at temperatures above the melting point of the lactam employed or its solution and preferably under 150° C., prior to adding an activator and starting the rapid polymerization. As molecular sieves synthetic zeolites having effective pore diameter of 3A., 4A., 5A., 6A. are most suitable for the purposes of the invention.

In the field of anionic (alkaline) polymerization of lactams several important improvements were reported during the last decade. The deciphering of the reaction mechanism thereof resulted in development of some new progressive technological processes, making use of the high polymerization rate. The first success involved the polymerization of 6-caprolactam. It has been, however, suggested also to polymerize in the above mentioned way other lactams with less than seven atoms in the ring, e.g., pyrrolidone, and also higher lactams as, e.g., 7-enantholactam, 8-caprylolactam, 10-caprinolactam or 12-laurolactam or their substituted homologues and derivatives such as C-alkyl lactams. A copolymerization was also considered.

Low content of the monomer, suitable physical properties, easy control and good reproducibility of the process were favorable for the development of anionic rapid polymerization of lactams, particularly using the so-called polymerization casting below the melting point of the polyamide thus formed. Said method makes possible the manufacture of articles of any size and shape, requiring almost no finishing. Continuous processes of this kind were used either for manufacture of granular polyamide as an intermediate for final working, e.g., pressing or extrusion, or for direct manufacture of "endless" profiles of various sorts, if the rapid polymerization process was combined with extrusion.

Usual catalysts employed today comprise systems with at least two components. The main component of all known and used systems forms a strong base, usually called "catalyst," while the other component ("activator") is a substance with an activated carbonyl group in a lactam molecule, of the type

wherein X is a polar substituent, or a substance capable of forming said structure in situ. Examples of such activators are N-acyl lactams, N-alkyl diacyl amines, isocyanates, and chlorides, anhydrides or esters of carboxylic acids.

The search for improvements has concentrated in recent years on the activator component.

It has been found, however, that for securing a reproducible process it is also important to have the "catalyst," i.e., the strongly basic compound, in a pure state, its method of preparation being thus equally important. As end product in the preparation of the basic catalyst the corresponding salt of the lactam involved is to be considered. The salt is at least partly dissociated in the molten lactam to yield a lactam anion and metal cation. The type and concentration of the strongly basic catalyst determines, together with the activator, the rate of polymerization. Its influence on the molecular weight of the polymer formed is, however, negligible at comparatively low temperatures, employing the usual concentration of the activator. Some methods of preparing anionic catalyst are less suitable because the reactions of basic compounds with lactams are accompanied by undesired side-reactions forming by-products which decrease the activity of the catalyst. For instance, metallic sodium yields not only the sodium salt of caprolactam but also hexamethylenimine, 6-aminohexanol and water, said by-products having an unfavorable influence on the polymerization rate and the molecular weight of the product.

One of the most often recommended and economically and technologically advantageous methods of preparing basic catalysts is the reaction of the lactams with alkali metal hydroxides. The reaction

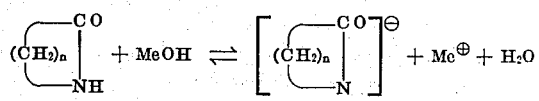

(where M is an alkali metal) is a reversible reaction and it is necessary to remove continuously the water from the reaction mixture, e.g., by distilling it from the top fractions of the lactam or by stripping it out by means of a stream of inert gas. The presence of water in the reaction mixture is to be avoided because water is a very active inhibitor of polymerization, hydrolyzing imide groups which are growth centers, and also amide groups with simultaneous decrease of alkalinity. The hydrolysis of the amidic group of the lactam molecule — forming the most important side-reaction in the preparation of the catalyst — may be suppressed by choosing suitable reaction conditions, particularly by decreasing temperature and thus also the pressure and the rate of distillation. The best results can be reached only at a pressure lower than 3 to 4 Torr at the corresponding boiling point of the lactam. Even at such conditions the yield of the alkali metal salt of 6-caprolactam is not fully quantitative because of the hydrolytic side-reaction. Moreover, the regeneration of the lactam, contained together with water in the top fraction in an amount up to 10 percent of the total amount of the lactam, is in any case to be considered. The preparation of alkali metal salts by this method is thus very exacting as to the maintenance of proper reaction conditions, the use of highly effective vacuum pumps being necessary. The removal of water from the reaction mixture and simultaneously the decrease of temperature can be made easier by adding solvents, thus forming azeotropic mixtures with water. This method has certain disadvantages in difficult removal of last traces of the solvent and the isolation of a fine crystalline salt is not entirely easy in most cases. The precipitated salt is rather gel-like in characteristic.

The preparation of alkali-metal lactam salts by the reverse reaction of lactams with alcoholates:

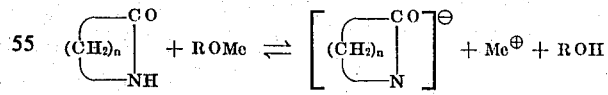

wherein R is a lower alkyl, requires distilling off the alcohol formed at reduced pressure together with the top fraction of the lactam, in order to avoid the acylation of the alcohol by the activator.

The present invention concerns a new method for preparation of lactam salts by reacting lactams with hydroxides or alcoholates of metals, particularly alkali metals; by means of molecular sieves. The use of molecular sieves for the removal of water or of other low molecular substances from gases, solvents or melts, i.e., from substantially static systems is known but their use for dynamic systems where said low molecular substances are liberated as a result of chemical reactions has not yet been hithertofore disclosed.

It has been found that molecular sieves, e.g., of the type of synthetic zeolites with a suitable size of crystalline interstices may be used for removing water or the lower aliphatic alcohols such as methanol, ethanol or isopropanol originating in the above mentioned reverse reactions. As suitable absorbents all molecular sieves with a minimum size of interstices, corresponding to the critical size of the water or alcohol molecules proved useful with optimum results being achievable if the size of said interstices was not larger than the size of the lactam molecule. Suitable products are, for instance, Nalsit 4A, Calsit 5A, Potasit 3A, Linde 3A, Linde 4A, Linde 5A (Registered Trade Marks), or other similar types of various products.

The removal of water or alcohols liberated during the reaction by a physico-chemical method has many advantages in comparison with the above discussed known method. The most important is the use of a very simple device and a low reaction temperature, limited by the melting point of the monomer on one hand and by decreasing absorption capacity of molecular sieves with increasing temperature on the other. Even when, for example, the molecular sieve 4A adsorbs at 150° C. more than 5 percent by weight of water — it is apparent that a substantially lower temperature determined by the melting point of the lactam would be more advantageous considering the rather high rate of hydrolysis of the amide group by the hydroxide at high temperature and considering also the substantially higher adsorption capacity at lower temperatures. From this standpoint the new method will be advantageous particularly in the case of lactams with low melting point such as 4-pyrolidone, 5-piperidone, 6-caprolactam, 7-enantholactam and 8-caprylolactam and their C-alkyl substituted derivatives.

The new method may be used, however, also for preparation of salts of higher melting lactams, e.g., of 12-laurolactam; but then it is preferably carried out in the presence of suitable inert solvents such as aromatic hydrocarbons, ethers and similar materials, thus making it possible to carry out the reaction in a solution at room temperature or only slightly increased temperature.

In view of the fact that the process is always controlled by establishing the reaction equilibrium and simultaneously by the diffusion rate of water or alcohol into the particles of the molecular sieve, it is clear that the duration of the reaction is dependent on time.

The optimum time depends on the temperature, on the kind of monomer and hydroxide and their concentrations and also on the kind of sieve and the experimental operation thereof. Therefore, the time is to be established individually, and specifically for each system. In most cases the required time of preparation in continuous operation is less than an hour.

The final product of the process is a solution of the lactam salt in molten lactam, and is utilizable immediately for polymerization. From the point of view of experimental or technological operation, it is possible to use either a discontinuous or a continuous process, the latter being particularly advantageous for pilot plant or industrial scale units.

For discontinuous or batch type operation, it is possible to meter into the melted lactam either the molecular sieve and a hydroxide (alcoholate) simultaneously or the two components separately, the molecular sieve been preferably added first. The amount by weight of the molecular sieve is selected by its capacity vs. its dependence on the temperature, by the water content of the lactam as well as by the amount of water or alcohol liberated by the reverse reaction. The total amount of water or alcohol must always be lower than the total capacity of the molecular sieve used. The process may be accelerated and the quality of the alkali metal lactam salt enhanced by stirring the reaction mixture or by circulating it in a closed space through a layer of the molecular sieve. After the reaction is finished, the resulting solution of the lactam salts in the melted lactam is separated from the molecular sieve by any suitable means, e.g., by filtration. While the discontinuous process is most suitable for small units or for preparation of some special types of polymers, the continuous process is more appropriate for an industrial process where the reaction mixture, containing a solution of an alkali metal hydroxide in molten lactam flows through a layer of the molecular sieve, e.g., in a column heated up to the melting point of the lactam, the resulting clear solution of the lactam salt in the lactam being led directly into the polymerization apparatus.

After the adsorption capacity of the sieve has been exhausted, it is sufficient to wash the sieve out with suitable solvents such as with water, alcohols, ketones, hydrocarbons, chlorinated hydrocarbons or similar substances and to heat the sieve up to the prescribed temperature, if desired at reduced pressure or in a stream of an inert gas, whereby the sieve is regenerated. The regeneration of the sieve may be carried out directly in the column in which the lactam salt solution is being prepared. The exhausted adsorption capacity of the sieve may be indicated in a usual, known manner, for instance, by a change of color of the sieve.

As is apparent from the preceding disclosure it is possible to prepare solution of salts of practically all cyclic lactams capable of anionic polymerization. The resulting reaction mixture may be immediately used for polymerization. In addition, with simple lactams of the formula

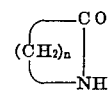

wherein $n$ is an integer from 2 to 14, it is possible to use also substituted lactams such as C-alkyl lactams or also mixtures of various lactams whereby copolymers may be prepared. The suggested method may be applied also to the preparation of a monomer mixture containing in addition to monolactams also lactams with a higher functionality, e.g., bis-lactams, derived from corresponding bis-cyclohexanones (such as bis-caprolactam, methylene-bis-caprolactam, methylene-bis-caprolactam, ethylidene-bis-caprolactam, tetramethylene-bis-caprolactam, izopropylidene-bis-caprolactam and similar).

For the purpose of the invention various hydroxides or alcoholates of alkali metals or alkaline earth metals such as sodium, potassium, cesium, rubidium, lithium, and barium may be used. Said compounds may be dissolved prior to the reaction in the lactam as such, or it is also possible to use their solutions in water, in alcohols or, advantageously, in inert solvents. With respect to full and economical utilization of the molecular sieve the first alternative is better; in order to decrease the time necessary for dissolution and for reducing the possible hydrolysis it is advantageous to use finely ground hydroxides.

The herein disclosed use of molecular sieves for preparing reaction mixtures suitable for polymerization has also the advantage that molecular sieves remove from the lactam some accompanying low molecular impurities, as so far as the size of the molecules corresponds to the size of the interstices in the sieve.

The quality of the salts prepared in this manner is comparable with the quality of the salts prepared from alcoholates of alkali metals using methods suitable for exact study of kinetics and mechanism of anionic polymerization. This has been proved by identical polymerization tests. The very good quality of the polymerization mixture prepared by means of molecular sieves results particularly from the low reaction temperature used which suppresses undesired side reactions. Further advantages of the new method is to be seen in the possibility for using lactams as currently marketed without removing the humidity adsorbed during the manipulation by distilling the lactam immediately before use. The necessary equipment for utilizing the invention is comparatively simple, whereby the economy of industrial production of polyamides from cyclic lactams can be enhanced. The new method also makes possible the manufacture polyamides in essentially non-chemical plants.

EXAMPLE 1

Fifty grams of the molecular sieve (Registered Trade Mark Nalsit 4A) were added to the melt of 3 moles of freshly distilled 6-caprolactam under nitrogen at 80° C. 0.0075 mole of sodium hydroxide was then added with slow stirring. After 20 minutes a part of the solution thus prepared (240 g) was introduced into a thermally insulated cylindrical reactor, the mixture was heated to 135° C. whereafter 0.0055 mole of N-acetylcaprolactam was added. After the finish of polymerization (half-time of polymerization being 10 minutes) and crystallization, the homogeneous block of the polymer was removed from the reactor. The polymer contained only 3.2 percent of low molecular components. Its polymerization degree was 480.

EXAMPLE 2

The process according to Example 1 was repeated except that undistilled, technically pure 6-caprolactam was used together with a regenerated sieve of the same kind. The obtained polyamide (half-time of polymerization being 12 minutes) contained 3.4 percent of low molecular compounds and had a polymerization degree of 465.

EXAMPLE 3

One-hundred and fifty grams of a molecular sieve (Registered Trade Mark Calsit 5A) were added to 4 moles of melted 8-caprylolactam under an argon atmosphere at 90° C., whereafter 0.01 mole of potassium hydroxide, was added with stirring. After 15 minutes 423 g of the potassium salt solution in the lactam were pumped into an adiabatic reactor and heated therein to 110° C. After addition of 0.0075 mole of N-benzoyl-caprolactam the reaction was completed almost instantaneously. The cooled polymer contained only 1.4 percent of low molecular weight compounds.

EXAMPLE 4

The process according to Example 3 was repeated except that instead of 8-caprylolactam, 7-enantholactam was used, the molecular sieve Calsit 5A being replaced by molecular sieve Linde 4A (Registered Trade Marks). The resulting polyamide contained 1.3 percent of compounds extractable with water.

EXAMPLE 5

Fifty grams of a molecular sieve Nalsit 4A (Registered Trade Mark) and 0.0075 mole of sodium methanolate were added to the 1 mole of melted 6-caprolactam and 0.5 mole of 12-laurolactam maintained under inert atmosphere at 100° C. After 15 minutes of stirring the mixture was divided into small polymerization apparatuses (21 g for each), and the polymerization was carried out at 180° C. after there being added 0.00075 mole of N,N-tetraacetyl hexamethylenediamine into each charge. The resulting polymer contained 3 percent of low molecular compounds.

EXAMPLE 6

0.45 g of bis-caprolactam, prepared from 6, C-bis-cyclohexanone, was dissolved in 33.9 g of melted caprolactam in a glass cylinder of 50 ml volume maintained at a temperature of 85° C. while stirring. Ten grams of the sieve Nalsit 4A (Registered Trade Mark) and 0.00076 mole of potassium hydroxide were then added through a side inlet tube. After 10 minutes stirring at 85° C., 22.8 g of the mixture were discharged into a small glass polymerization apparatus and the polymerization was carried out by adding 0.0005 mole of N-acetylcaprolactam and heating to 250° C. under inert atmosphere. After 6 minutes the polymer was cooled down; it contained 10 percent of low molecular substances and was insoluble in m-cresol.

EXAMPLE 7

Fifty grams of Nalsit 4A molecular sieve (Registered Trade Mark) were added to 3 moles of 6-caprolactam containing 0.0075 mole of γ,γ'-bis-caprolactam at 95° C. and after a while 0.0075 mole of potassium methanolate was stirred in to the mixture. After 30 minutes the reaction mixture was separated from the sieve and pumped into an adiabatic reactor, where 0.0075 mole of N-acetylcaprolactam were added after the mixture was heated up to 150° C. The polymerization was completed in 10 minutes. The polymer contained 5.4 percent of extractables and was insoluble in m-cresol.

EXAMPLE 8

One-hundredth mole of potassium methanolate was dissolved at 80° C. in a solution of 1 mole caprolactam in 100 ml of benzene whereafter 30 g of Nalsit 4A molecular sieve were added while stirring. After 30 minutes the solution was introduced in a three-necked flask, provided with a reflux cooler, thermometer and stirring device. One-hundredth mole of N-phenyl carbamoyl caprolactam was gradually added at 80° C. After 100 minutes, 8 percent by weight of powder-like polymer separated.

EXAMPLE 9

A cylindrical glass column, 1,000 mm long and with a diameter of 60 mm, heated to 75° C. by means of a heating jacket was filled up with molecular sieve Nalsit 4A. A solution of 0.3 mole percent of sodium hydroxide in 6-caprolactam, maintained at the same temperature, was poured through the column. From the bottom of the column the solution of sodium salt of caprolactam in caprolactam was continuously drawn off. The catalyst solution thus obtained was used for a series of experiments for adiabatic polymerization in molds, the samples being heated to 120°, 130°, 140° and 150° C. respectively and 0.3 mole percent of N-acetylcaprolactam added thereto. The properties of the polymers obtained were the same as when the polymers were prepared with pure crystalline sodium salt of 6-caprolactam at equal concentration of the components. In another series of experiments the catalyst solution with added, activator (0.3 mole percent of N-acetylcaprolactam) was metered into a tubular reactor for continuous manufacture and the molten polymer was extruded in the form of a string (monofil) with 1 mm diameter. The content of extractables amounted to 10.2 percent. In a third series of experiments, the catalyst solution from the column was poured into metallic containers (made of aluminum or stainless steel) and thereafter, the containers were sealed under inert atmosphere. The polymerization activity of the mixture decreased after 2 months only by 10 percent.

What is claimed is:

1. In a method for preparing polymerizable mixtures for anionic polymerization of lactams selected from the group consisting of

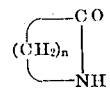

wherein $n$ is an integer from 2 to 14, C-alkyl lactams, bis-caprolactam, methylene-bis-caprolactam, methylene-bis-caprolactam, ethylidene-bis-caprolactam, tetramethylene-bis-caprolactam, and izopropylidene-bis-caprolactam, by reacting a compound selected from the group consisting of alkali metal hydroxides and alkali metal alcoholates with said lactams and removing water or alcohol respectively, the improvement step which comprises contacting the reaction mixture with molecular sieves of synthetic zeolite type.

2. A method for preparing polymerizable mixtures for anionic polymerization of lactams according to claim 1, in which the reaction mixture is contacted with a molecular sieve of synthetic zeolite type having an effective pore diameter from 3 to 6A., and separating the resulting lactam alkali metal salt solution in lactam from the molecular sieve.

3. A method for preparing polymerizable mixtures for anionic polymerization of lactams according to claim 1 in which the lactam is reacted in the molten state.

4. A method for preparing polymerizable mixtures for anionic polymerization of lactams according to claim 1 in which the lactam is reacted in a solution.

5. A method for preparing polymerizable mixtures for anionic polymerization of lactams according to claim 1 in which the lactam is reacted with an alkali metal hydroxide.

6. A method for preparing polymerizable mixtures for anionic polymerization of lactams according to claim 1 in which the lactam is reacted with an alkali metal alcoholate.

7. A method for preparing polymerizable mixtures for anionic polymerization of lactams according to claim 1 in which the molecular sieve has an effective pore diameter from 3 to 6 A.

* * * * *